July 21, 1936.  R. N. DU BOIS  2,047,998
INTERNAL COMBUSTION ENGINE AND METHOD OF OPERATING SAME
Filed June 29, 1932  6 Sheets-Sheet 1

Fig.1

INVENTOR.
RALPH N. DuBois
BY
ATTORNEY.

July 21, 1936.  R. N. DU BOIS  2,047,998
INTERNAL COMBUSTION ENGINE AND METHOD OF OPERATING SAME
Filed June 29, 1932  6 Sheets-Sheet 2

Fig. 1ª

INVENTOR.
RALPH N. DU BOIS
BY
ATTORNEY.

INVENTOR.
RALPH N. DuBois
BY
ATTORNEY.

INVENTOR.
RALPH N. DuBOIS
BY
ATTORNEY.

Patented July 21, 1936

2,047,998

UNITED STATES PATENT OFFICE 2,047,998

INTERNAL COMBUSTION ENGINE AND METHOD OF OPERATING SAME

Ralph N. Du Bois, Grosse Pointe Farms, Mich., assignor to Continental Motors Corporation, Detroit, Mich., a corporation of Virginia Application June 29, 1932, Serial No. 619,992

20 Claims. (Cl. 123—81)

This invention relates to internal combustion engines and methods of operating same and has particular reference to engines of the general class known as sleeve valve engines.

It is an object of my invention to provide novel and improved means and methods for increasing the efficiency of engines of the general type aforesaid, having particular reference to the fuel mixture distribution for the respective cylinders of the engine.

It is a further object of my invention to provide means and methods for improving the volumetric efficiency, power output and general performance characteristics of internal combustion engines particularly of the sleeve valve type.

In carrying out the objects of my invention I supply a combustible fuel mixture to the various cylinders of the engine, the fuel mixture stream for each cylinder being divided into a plurality of separate and preferably individual paths respectively leading to the intake ports of each cylinder. In order to even further obtain the desirable benefits and advantages aforesaid, I further provide for increasing the velocity of the fuel mixture as it is conducted along the aforesaid paths although the increase in velocity is subordinate to dividing the fuel mixture stream.

A further feature of my invention in its more specific aspects resides in the provision of a plurality of fuel mixture conduits for each cylinder, said conduits respectively conducting fuel mixture through the cylinder block intake chamber to the intake ports of the cylinder. The cross-sectional area of the various conduits decreases in the direction of fuel mixture flow to a region of minimum cross sectional area in one embodiment of my invention. This minimum area preferably has a definite relationship with respect to the cooperating intake ports of the cylinder and sleeve valve means associated therewith, the cross sectional area of the conduits increasing from said minimum zone so as to terminate substantially in the area and shape of the cylinder intake ports. I have found it desirable to construct these conduits without abrupt changes in direction or otherwise disturb a smooth flow of fuel mixture which would tend to decrease the efficiency of my improvements. As the description progresses the particular relationship of the conduits, intake ports and other parts of the engine and fuel mixture system will be more apparent and further objects and advantages of my improvements will also be apparent.

In one embodiment of my invention the aforesaid minimum cross-sectional area of the various conduits preferably substantially equals the area of the associated intake port when fully open and this minimum area is located as closely to the associated cylinder intake port as possible. Since the intake port is usually larger than the effective maximum intake area, for engines of the particular type illustrated, it is necessary to merge the walls of each conduit toward the associated intake port, the area increasing somewhat. However, with the minimum area located closely adjacent the intake port, the gases passing through the conduit enter the associated intake port at substantially the velocity of the gases at the zone of minimum cross-sectional area. Of course, where the particular engine in question is of a nature providing maximum effective port opening equal to the area of the intake port, then the conduits preferably gradually decrease in area to a minimum area formed by the several intake ports themselves and such arrangement may even be used to advantage in engines of the particular type shown for purposes of illustrating my invention. My invention in its broad aspects is not limited to conduits of changing or decreasing cross-sectional area although this is generally deemed advisable for best results. The individual port conduits in themselves are of great advantage in distributing the intake gases to the intake ports without interference in the cylinder block intake chamber, the conduits greatly reducing the "eddy losses" or "restriction of flow" at the ports, giving better fuel mixture ramming and intake effects.

This application is a continuation in part of my co-pending application, Serial No. 576,447 filed November 21, 1931, this application illustrating a further embodiment of my invention as broadly claimed in said application Serial No. 576,447. This further embodiment is directed to the intake conduits dividing the intake fuel mixture stream directly at the cylinder block intake chamber opening instead of adjacent thereto as illustrated in the aforesaid application. In both embodiments, the incoming fuel mixture stream is divided in the general direction of fuel mixture flow. The further embodiment also is directed to the conduits tapering gradually toward the intake ports where they have their minimum cross-sectional area instead of at a zone adjacent to the ports. In either embodiment, however, these conduits may be said to terminate at or to extend to substantially the intake opening in the cylinder block.

Referring to the accompanying drawings which are illustrative of several embodiments of my invention, and in which similar reference characters indicate corresponding parts.

Referring to the drawings the engine illustrated has a cylinder block 10 provided with a plurality of longitudinally spaced bores or cylinders 11, each cylinder having a plurality of exhaust ports 12 and a plurality of circumferentially spaced intake ports designated respectively as 13, 14, 15, 16, and 17. For purpose of illustration I have shown my invention in connection with an engine of the single sleeve valve type generally known as the Burt-McCollum type in which a single sleeve valve 18 is given a combined axial reciprocation and oscillation by any well known suitable driving mechanism whereby any point on the sleeve valve traces a closed curve path 19 with respect to its associated cylinder. While my invention is not necessarily limited to this type of single sleeve valve engine it nevertheless affords particular advantages, especially in connection with certain phases thereof as will be more apparent later.

The cylinder intake and exhaust ports aforesaid are preferably located as usual substantially in a plane perpendicular to the cylinder axis and the sleeve valve associated with each cylinder is provided with exhaust ports 20 respectively cooperating with the cylinder exhaust ports 12. Each sleeve valve also has the circumferentially spaced intake ports 21, 22, 23, 24, and 25 for respectively cooperating with the cylinder intake ports 13, 14, 15, 16, and 17. The description for the most part will be limited to one of the engine cylinders and associated fuel mixture conduits, it being understood that the remaining cylinders and other parts are similarly constructed.

Figure 9:
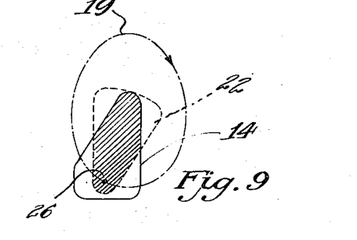
Fig. 9 is a diagrammatic view illustrating a typical cylinder and sleeve intake port at the time of maximum opening.

Referring to Fig. 9 I have illustrated a typical cylinder intake port such as the port 14 and its associated sleeve intake port 22, a point 26 thereof having the closed curve path 19 as will be readily understood for this type of engine. In Fig. 9 the cooperating intake ports 14 and 22 are shown in the position of maximum opening and the shaded portions of this figure represent this maximum effective port area.

Figure 1:
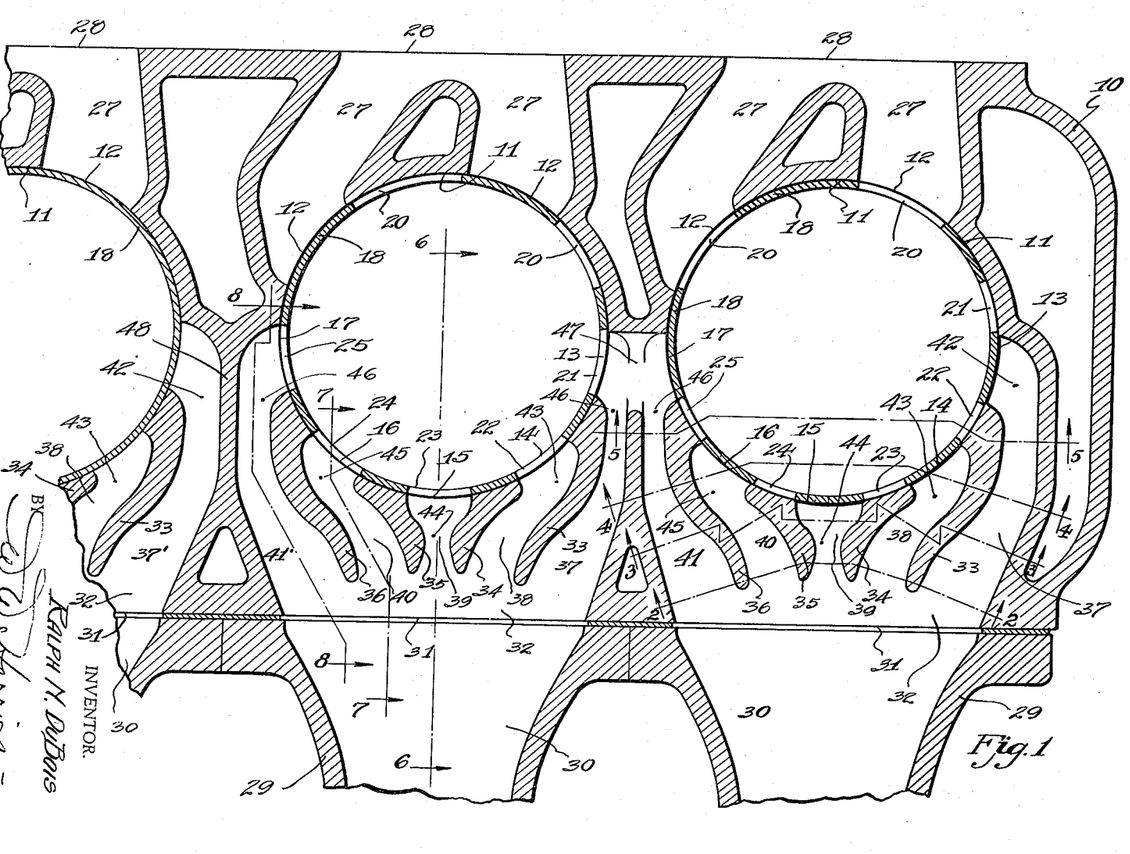
Fig. 1 is a sectional plan view through a portion of the engine showing the fuel mixture intake system.

Fig. 1 shows the end cylinder 11 (at the right hand portion of cylinder block 10) at the time of exhaust opening, at which time the exhaust gases will pass from the cylinder through sleeve exhaust ports 20 and cylinder exhaust ports 12 and thence through the cylinder block exhaust chamber conduits 27 to the exhaust chamber outlet 28 at the side of the cylinder block. It will be understood that the usual exhaust manifold (not shown) has a series of branches adapted to register with the spaced outlets 28 for conducting the exhaust gases away from the engine.

At the other side of the cylinder block the fuel mixture, such as gasoline and air carbureted in the usual way, is conducted from the carburetor (not shown) and thence through the intake manifold 29, preferably having a series of branch portions 30 respectively leading to the side of the cylinder block for conducting portions or divisions of the fuel mixture separately toward each of the engine cylinders. Thus the manifold branches 30 respectively open to the cylinder block intake chamber opening 31, the openings 31 for the several cylinders being spaced longitudinally along the side of the cylinder block as shown in Fig. 1. Each cylinder is provided with a cylinder block intake chamber 32 surrounding that portion of the associated cylinder which contains the cylinder intake ports. The intake chamber 32 is provided with a series of spaced partition walls or cylinder wall extensions 33, 34, 35, 36 for the five port intake arrangement illustrated, these partition walls constituting individual or separate conduits 37, 38, 39, 40, and 41 for dividing the incoming fuel mixture from manifold branches 30 into separate or individual paths or streams of fuel mixture which paths lead to the respective cylinder intake ports. The outer ends of the partition walls are arranged in spaced relation adjacent opening 31 and longitudinally across said opening so as to efficiently divide the fuel mixture stream without eddying.

One important feature of my invention resides in the manner in which the fuel mixture is conducted along the several paths in the intake chamber conduits, whereby a larger quantity of fuel mixture is introduced to the associated engine cylinder than would otherwise occur.

Heretofore it has been customary to introduce the fuel mixture to the engine in such a manner that the gas flow passes to the intake chamber of the cylinder block which is ordinarily open to the several ports. This results in fuel disturbances, eddying, inefficient ramming effects, and much loss in the quantity of intake largely owing to the low gas flow or orifice coefficient at the ports. I have greatly minimized the port flow losses by dividing the fuel stream remotely from the ports and in the general direction of fuel stream flow, thereby greatly reducing intake losses and resulting in obtaining a larger quantity of fuel mixture intake. My invention further minimizes the tendency for the fuel to drop out of the intake stream on reaching the intake chamber.

Figure 2:
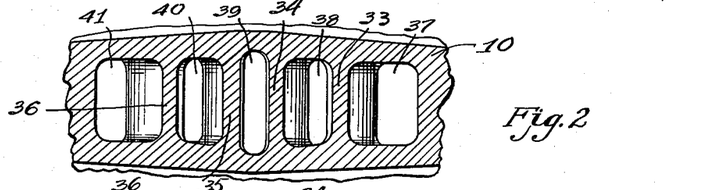
Figs. 2, 3, 4, and 5 are respectively detail sectional views through the intake conduits along the lines 2—2, 3—3, 4—4, and 5—5 respectively of Fig. 1.
Figures 2A, 3A:
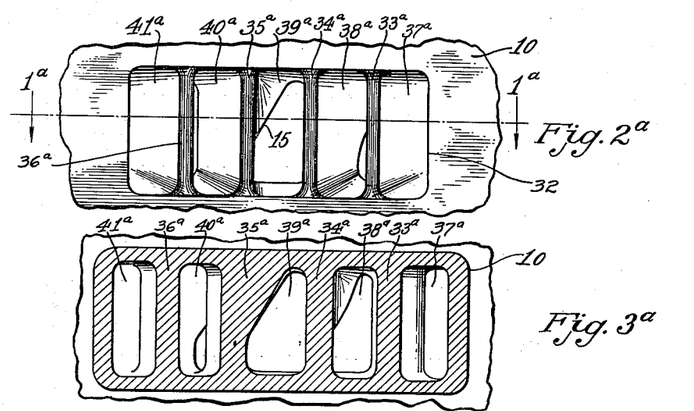
Figure 3:
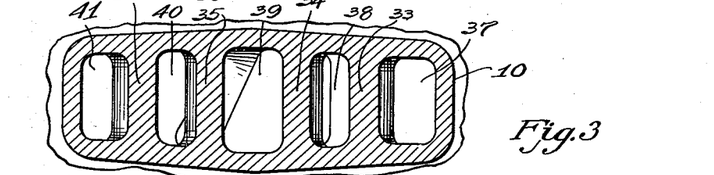
Figure 4:
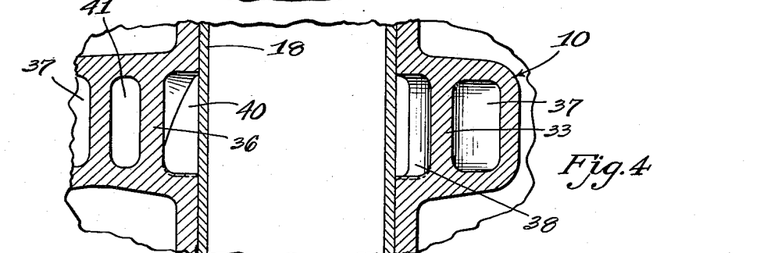
Figure 4A:
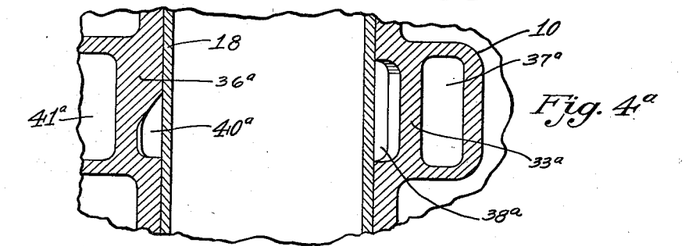
Figure 5:
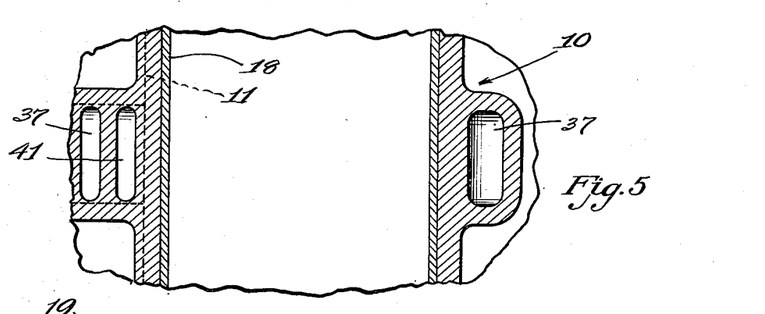
Figure 5A:
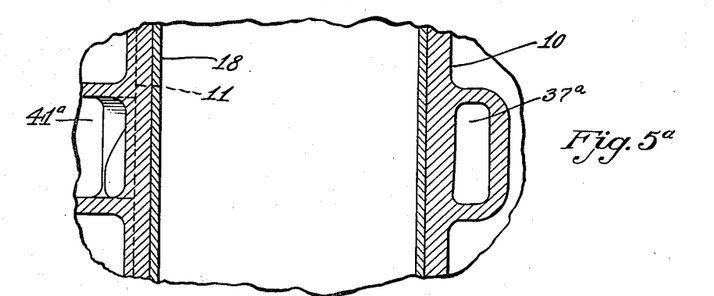
Figure 6:
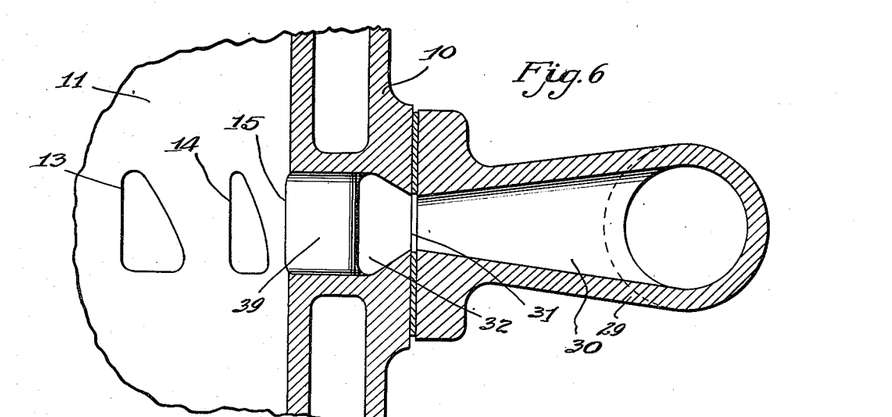
Fig. 6 is a sectional elevation view through the intake manifold and associated cylinder along the line 6—6 of Fig. 1.
Figure 6A:
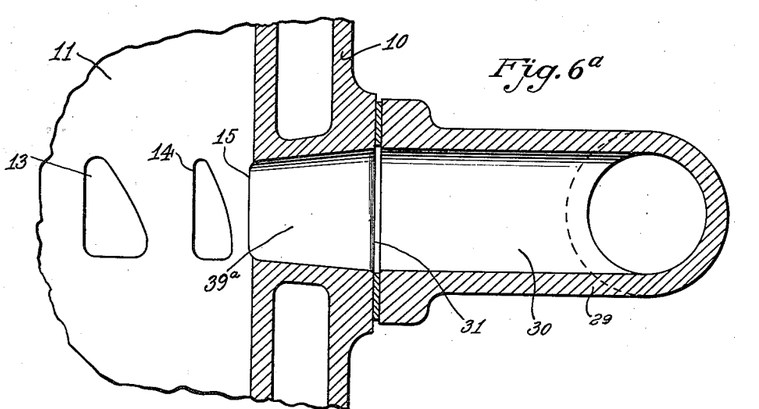
Figure 7:
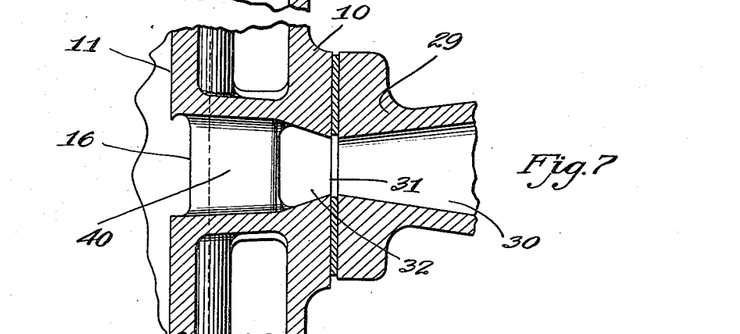
Fig. 7 is a detail sectional elevation view along the line 7—7 of Fig. 1 illustrating one of the intake conduits.
Figure 7A:
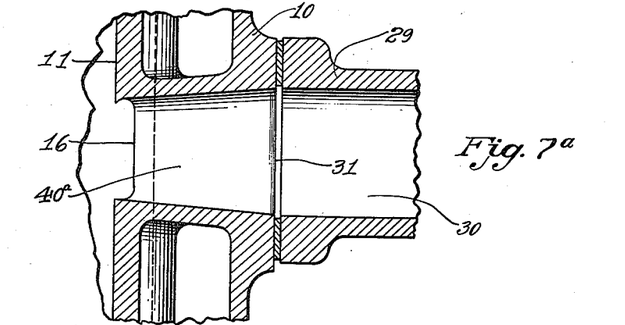
Figure 8:
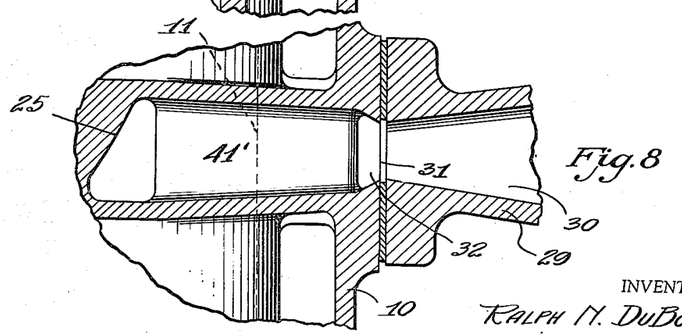
Fig. 8 is a further detail sectional view of one of the outer conduits along the line 8—8 of Fig. 1.
Figure 8A:
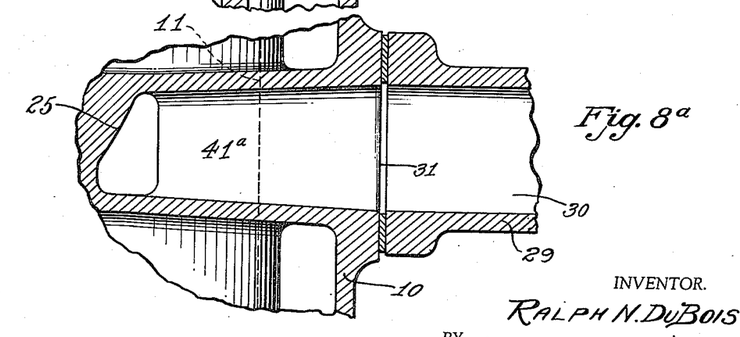

The accelerated movement or increase in velocity further materially increases the volumetric efficiency of the engine and hence increases its power output and generally improves the efficiency and operation of the engine. In order to accomplish these benefits I form each of the intake chamber conduits with an opening having an area preferably at least as great as the area of the associated cylinder intake port, Fig. 2 showing the areas of the several conduits substantially at the entrance to the conduits. The conduits are formed with gradually diminishing cross sectional areas toward the cylinder intake ports which will result in imparting to the fuel mixture the aforesaid accelerated movement. I preferably form the walls of the conduits without abrupt changes in cross sectional area so as to obtain a smooth wall condition bounding the conduits, thereby avoiding eddying and friction losses of the fuel mixture during passage through the conduits. The cross sectional area of the conduits thus gradually diminishes until a zone is reached of minimum cross sectional area and this minimum area is in one embodiment of my invention, preferably located as closely to the associated cylinder intake port as is practical consistent with eliminating abrupt changes in cross sectional area. As a practical compromise for obtaining the benefits incident to the increase in gas velocity, I position this minimum area for each conduit substantially adjacent its associated cylinder intake port, leaving just sufficient distance between the minimum area and the cylinder intake port for obtaining a smooth bounding wall for the conduit, this portion of the conduit being of progressively increasing cross-sectional area from the minimum area to the cylinder intake port which constitutes the opening or outlet for the conduit. It will be understood that the distance from the minimum zone to the cylinder intake port is materially less than the distance from the entrance to any conduit to its minimum zone. Thus in Fig. 1 the zones of minimum cross sectional area for the respective conduits are substantially as indicated at 42, 43, 44, 45, and 46.

One feature of my invention resides in forming the cross sectional areas of the aforesaid minimum zones in a definite relationship with the cooperating cylinder and sleeve valve intake ports respectively 14 and 22 for example. Thus each conduit has its minimum zone of area substantially equal to the effective area of maximum opening of its associated cylinder and intake ports, this being indicated by the shaded area in Fig. 9. It is desirable that the minimum zone area should not be less than this shaded area of Fig. 9 in order to avoid restriction in the conduit and by constructing the minimum zone as aforesaid I obtain substantially the greatest increase in velocity for the fuel mixture flow.

If desired, the changing cross sectional area for the intake chamber conduits may be eliminated and the cross sectional area maintained substantially constant, such structure being broadly a part of my invention for increasing the efficiency of fuel mixture distribution for engines of the general character illustrated. I prefer, however, to provide the intake chamber conduits with the varying cross sectional areas substantially as illustrated and described in order to more fully realize and accomplish the objects of my invention.

It will be noted that the adjacent cylinders to the right of Fig. 1 have their adjacent conduits 37 and 41 respectively open to each other at 47 for the purpose of facilitating the casting operation of the cylinder block although it is not necessary to provide such opening 47 and I have shown in the next adjacent pair of cylinders the corresponding conduits 37' and 41' which are separated by a dividing wall 48 which is free of any opening. The conduit 41' has the same cross-sectional areas at any point along its length as the cross sectional areas of conduit 41. While the conduits 37' and 41' are illustrated as respectively having a greater dimension longitudinally of the engine at certain points than the conduits 37 and 41, it will be understood that the dimension of these conduits 37' and 41' at right angles thereto or axially of the cylinder are somewhat less for the conduits 37' and 41' than for conduits 37 and 41 so as to equalize the cross-sectional area as aforesaid.

By referring to Figs. 2, 3, 4, and 5 the manner in which the cross-sectional areas for the several conduits is progressively varied along portions of the conduits will be readily apparent.

Referring now to Figs. 1a to 8a, it will be noted that the several views correspond respectively to Figs. 1 to 8 and the operation of the parts is, for the most part, identical with those aforesaid. Wherever the parts are similar to those already described, similar reference characters are used, and such parts will not be again described in connection with Figs. 1a to 8a.

Partitions 33ª to 36ª forming individual intake chamber port conduits 37ª to 41ª correspond respectively to partitions 33 to 36 and conduits 37 to 41 but it will be noted that in Figs. 1a to 8a the conduits 37ª to 41ª gradually decrease in cross sectional area inwardly to the respective cylinder intake ports 13 to 17 respectively, which ports are minimum areas along the lengths of the conduits. Thus the gas velocity is increased to a maximum immediately at the intake ports instead of at the minimum area zones 42 to 46 of Fig. 1 adjacent these intake ports. In either case the effect is substantially the same.

Figure 1A:
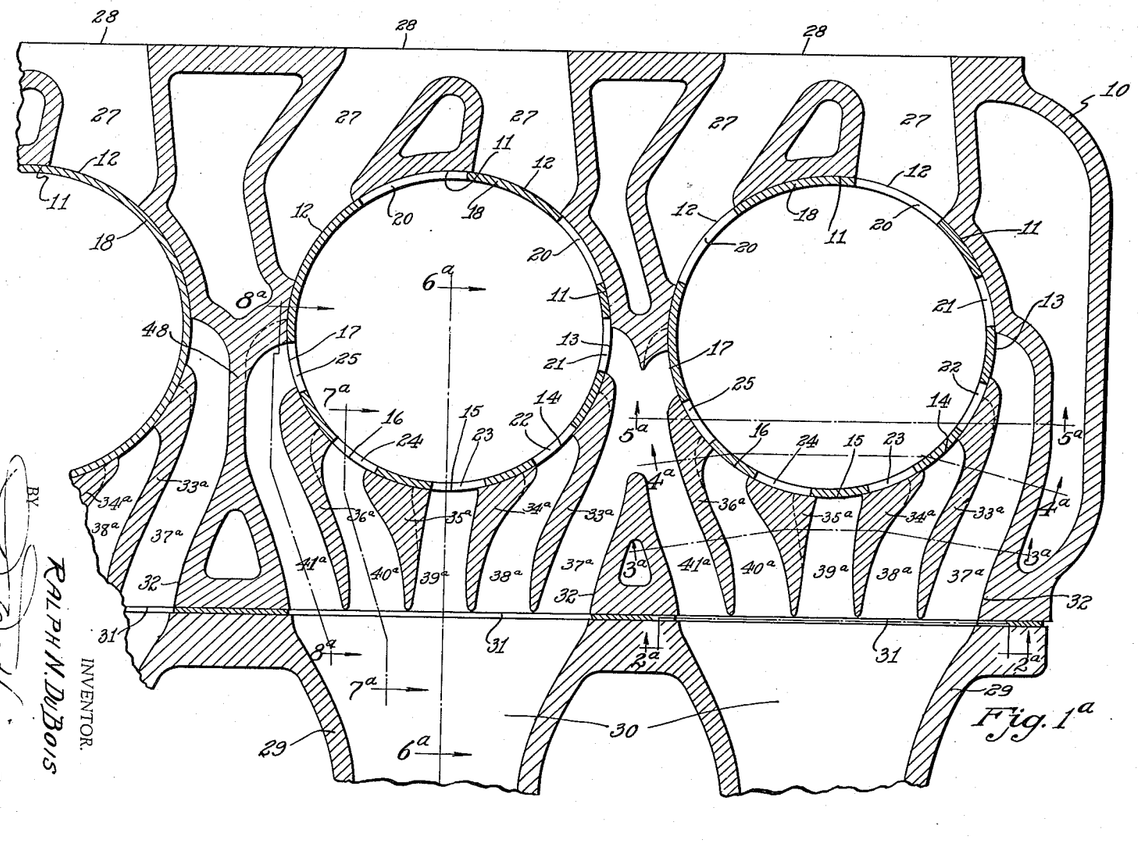
Fig. 1a is a view corresponding to Fig. 1 illustrating a modified form of the invention wherein the intake conduits terminate outwardly to the cylinder block intake opening and wherein the intake conduits decrease in area gradually inwardly to a minimum formed by the area of the associated cylinder intake ports, the section being taken along the line 1ᵃ—1ᵃ of Fig. 2a, Figs. 2a, 3a, 4a, and 5a are respectively detail sectional views along the lines 2ᵃ—2ᵃ, 3ᵃ—3ᵃ, 4ᵃ—4ᵃ, and 5ᵃ—5ᵃ of Fig. 1a, Fig. 6a is a sectional elevation through the intake manifold and associated cylinder along the line 6ᵃ—6ᵃ of Fig. 1a, Figs. 7a and 8a are respectively further detail sectional views along the lines 7ᵃ—7ᵃ, and 8ᵃ—8ᵃ of Fig. 1a, and Fig. 10 is a detail sectional view of the intake portion of an engine cylinder illustrating a still further modification of my invention.

In Fig. 1a the partitions 33ª to 36ª extend outwardly from cylinder 11 and in the intake chamber 32 to the opening 31. Fig. 1a shows these partitions for dividing the fuel stream at the point where the fuel stream passes from manifold branch 30 to the cylinder block intake 31. The effect of dividing the fuel stream is substantially the same in Fig. 1 and Fig. 1a, since in either instance the fuel stream is divided sufficiently far from the intake ports to prevent gas flow interference in the chambers 32 and to increase the gas flow velocity where the latter feature is desired.

Figure 10:
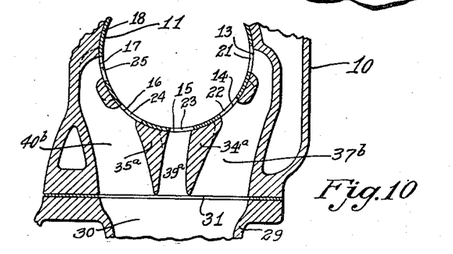

Referring to Fig. 10 I have shown a grouping of cylinder intake ports 13 and 14 for communication with a common intake conduit 37ᵇ preferably of decreasing cross sectional area from the inlet 31 to the cylinder. Likewise ports 16 and 17 are grouped for communication with the conduit 40ᵇ, while port 15 communicates with the identical conduit 39ª shown in Figs. 1a and 3a. The Fig. 10 embodiment of my invention is not as desirable as the Figs. 1 or 1a embodiment since only partial benefits of the teachings of my improvements are realized.

In Figs. 1, 1a, and 10 the partitions illustrated are in the nature of extensions of the cylinder walls, the extensions being outward from the cylinders toward the inlets to the several cylinder block intake chambers. In each instance the partitions and fuel passages formed thereby preferably terminate outwardly of the cylinder block opposite the cylinder block intake opening 31.

It will further be noted that the partitions or cylinder wall extensions through the several embodiments of my invention have a diminishing cross section longitudinally of the engine as the partitions extend outwardly from the cylinders as this provides for sufficient spacing of the partition ends to accommodate the required amount of fuel mixture passing from the manifold branch into the several intake chamber conduits. In this manner the area of my partition in the path of the fuel mixture stream is greatly less than the area of the space between a pair of cylinder intake ports to either side of the partition, thereby greatly reducing the coefficient of intake gas flow friction.

It will be understood that the number of intake ports for each cylinder may be varied as it is frequently customary in the particular type of sleeve valve engine illustrated to provide three intake ports instead of five as illustrated. In such instance I would preferably provide three intake chamber conduits instead of five as illustrated.

Various modifications and changes may be made over the specific forms of my invention illustrated, without departing from the spirit and scope of my invention, and I do not limit my invention to the specific constructions illustrated.

What I claim as my invention is:

1. In an engine of the sleeve valve type, a cylinder block having a cylinder formed therein and provided with an intake port, sleeve valve means associated with said cylinder and having an intake port adapted to cooperate with said cylinder intake port, and means for conducting fuel mixture to said cylinder intake port including a passage formed in the cylinder block, said passage having a portion of diminishing cross-sectional area in the direction of fuel mixture flow therethrough, said passage having a second portion of increasing cross-sectional area in the direction of fuel mixture flow therethrough and beyond said portion of diminishing cross-sectional area, said passage having a zone of minimum cross-sectional area intermediate said first and second portions, the area of said zone being substantially equal to the maximum opening provided by said sleeve and cylinder intake ports.

2. In an engine of the sleeve valve type, a cylinder block having a cylinder formed therein and provided with an intake port, sleeve valve means associated with said cylinder and having an intake port adapted to cooperate with said cylinder intake port, and means for conducting fuel mixture to said cylinder intake port including a passage formed in the cylinder block, said passage having a portion of diminishing cross-sectional area in the direction of fuel mixture flow therethrough, said passage having a second portion of increasing cross-sectional area in the direction of fuel mixture flow therethrough and beyond said portion of diminishing cross-sectional area, said passage having a zone of minimum cross-sectional area intermediate said first and second portions, the area of said zone being substantially equal to the maximum opening provided by said sleeve and cylinder intake ports, but less than the area of one of said ports.

3. In an engine of the sleeve valve type, a cylinder block having a cylinder formed therein and provided with an intake port, sleeve valve means associated with said cylinder and having an intake port adapted to cooperate with said cylinder intake port, and means for conducting fuel mixture to said cylinder intake port including a passage formed in the cylinder block, said passage having a portion of diminishing cross-sectional area in the direction of fuel mixture flow therethrough, said passage having a second portion of increasing cross-sectional area in the direction of fuel mixture flow therethrough and beyond said portion of diminishing cross-sectional area, said passage having a zone of minimum cross-sectional area intermediate said first and second portions, the area of said zone being substantially equal to the maximum opening provided by said sleeve and cylinder intake ports, but less than the area of either of said ports.

4. In an engine of the sleeve valve type having a cylinder formed therein and provided with an intake port, a single sleeve valve adapted to move in a closed curve path and provided with an intake port adapted to cooperate with said cylinder intake port, said ports at maximum intake opening providing an intake area less than the area of said cylinder intake port, and means for conducting fuel mixture to said cylinder intake port comprising a passage formed in the cylinder block, said passage having a portion of a varying cross-sectional area whose minimum area is substantially equal to said intake area at maximum intake opening of said ports.

5. In an engine of the sleeve valve type, a cylinder block having a cylinder formed therein and provided with a plurality of spaced intake ports, sleeve valve means associated with said cylinder and having a plurality of spaced intake ports respectively adapted to cooperate with said cylinder intake ports, said cylinder block having an intake chamber opening laterally at the side thereof, said chamber having a plurality of partitions formed therein providing fuel mixture passages respectively terminating inwardly of the cylinder block in said cylinder intake ports, said passages having a varying cross-sectional area for accelerating the movement of fuel mixture conducted therethrough.

6. In an engine of the sleeve valve type, a cylinder block having a cylinder formed therein provided with a plurality of circumferentially spaced intake ports, sleeve valve means for controlling said ports, an intake chamber formed in said cylinder block opening outwardly thereof, means for conducting a fuel mixture to said intake chamber opening, and means cooperating with said opening for dividing the fuel mixture into individual paths respectively communicating with said cylinder intake ports, said dividing means being constructed and arranged to accelerate the movement of the fuel mixture in said paths.

7. In an engine of the sleeve valve type, a cylinder block having a cylinder formed therein provided with a plurality of circumferentially spaced intake ports, sleeve valve means for controlling said ports, an intake chamber formed in said cylinder block opening outwardly thereof, means for conducting a fuel mixture to said intake chamber opening, said intake chamber having a plurality of partition walls terminating in spaced relation across said chamber opening for dividing the fuel mixture, said partition walls forming conduits for conducting the divided fuel mixture in individual paths respectively to said cylinder ports, said partition walls being constructed and arranged to accelerate the travel of the fuel mixture during passage thereof through said conduits.

8. In an engine of the sleeve valve type, a cylinder block having a cylinder, said cylinder block having an intake chamber extending laterally from said cylinder to provide an intake chamber fuel mixture inlet at the side of the cylinder block, said intake chamber inlet being adapted to receive a stream of fuel mixture, said intake chamber extending partially around said cylinder and longitudinally of the cylinder block to each side of said intake chamber inlet, said cylinder having a plurality of intake ports spaced around that portion of the cylinder which is in communication with said chamber, said intake chamber having a plurality of partitions extending from said cylinder toward said intake chamber inlet, said partitions dividing the fuel mixture stream substantially across the path of flow and conducting the fuel stream divisions to said intake ports and providing means for accelerating fuel mixture travel intermediate said partitions.

9. In an engine of the sleeve valve type, a cylinder block having a cylinder, said cylinder block having an intake chamber extending laterally from said cylinder to provide an intake chamber fuel mixture inlet at the side of the cylinder block, said intake chamber inlet being adapted to receive a stream of fuel mixture, said intake chamber extending partially around said cylinder and longitudinally of the cylinder block to each side of said intake chamber inlet, said cylinder having a plurality of intake ports spaced around that portion of the cylinder which is in communication with said chamber, said intake chamber having a plurality of partitions extending from said cylinder toward said intake chamber inlet, said partitions dividing the fuel mixture stream substantially across the path of flow and conducting the fuel stream divisions to said intake ports, said partitions extending outwardly from said cylinder so as to directly face the fuel mixture stream at said intake chamber inlet and providing means for accelerating fuel mixture flow toward said cylinder intake ports.

10. In an engine of the sleeve valve type, a cylinder block having a cylinder, said cylinder block having an intake chamber extending laterally from said cylinder to provide an intake chamber fuel mixture inlet at the side of the cylinder block, said intake chamber inlet being adapted to receive a stream of fuel mixture, said intake chamber extending partially around said cylinder and longitudinally of the cylinder block to each side of said intake chamber inlet, said cylinder having a plurality of intake ports spaced around that portion of the cylinder which is in communication with said chamber, said intake chamber having a plurality of partitions extending from said cylinder toward said intake chamber inlet, said partitions dividing the fuel mixture stream substantially across the path of flow and conducting the fuel stream divisions to said intake ports, said partitions extending outwardly from said cylinder so as to directly face the fuel mixture stream at said intake chamber inlet, said partition conduits having a changing cross-sectional area for accelerating the movement of fuel mixture conducted therethrough.

11. In an engine having a cylinder block provided with a cylinder, said cylinder having a plurality of intake ports, said cylinder block having an intake chamber and fuel mixture inlet means for said chamber, said intake chamber having a plurality of partitions forming fuel mixture conduits communicating inwardly with said intake ports, said partitions extending outwardly from said cylinder toward said intake chamber inlet into close association therewith, said partitions being constructed and arranged to accelerate the travel of the fuel mixture during passage thereof through said conduits.

12. In an engine having a cylinder block provided with a cylinder, said cylinder having a plurality of intake ports, said cylinder block having an intake chamber and fuel mixture inlet means for said chamber, said cylinder having lateral wall extensions intermediate said ports, said extensions projecting outwardly in said intake chamber substantially to said chamber inlet.

13. In an engine having a cylinder block provided with a cylinder, said cylinder having a plurality of intake ports, said cylinder block having an intake chamber and fuel mixture inlet means for said chamber, said cylinder having lateral wall extensions intermediate said ports, said extensions diminishing in cross-section from said cylinder outwardly therefrom toward said chamber inlet to provide passages increasing in cross-section from said cylinder outwardly thereof toward said chamber inlet.

14. In an engine having a cylinder block formed with an intake opening in the side wall thereof, said cylinder block having a cylinder formed with a plurality of intake ports and an intake chamber between said intake opening and said ports, and means for dividing the intake gas at said opening into a plurality of intake gas streams, said means including partitions forming passages for conducting said streams separately from said opening and through said chamber toward the intake ports, said partitions being constructed and arranged to accelerate the fuel mixture flow through said intake chamber.

15. In an engine having a cylinder block having a cylinder, said cylinder having a plurality of ports spaced partially around the side wall thereof, means directing a fuel mixture stream toward said cylinder ports, and a plurality of partitions extending from between adjacent intake ports toward said fuel stream, said partitions having fuel stream dividing edges of less area in the path of the fuel stream than the areas of the corresponding spaces between adjacent intake ports.

16. In an engine of the sleeve valve type, a cylinder block having a cylinder formed therein and provided with a plurality of spaced intake ports, sleeve valve means associated with said cylinder and having a plurality of spaced intake ports respectively adapted to cooperate with said cylinder intake ports, said cylinder block having an intake chamber opening laterally at the side thereof, said chamber having a plurality of partitions formed therein providing fuel mixture passages respectively terminating inwardly of the cylinder block in said cylinder intake ports, said fuel mixture passages terminating outwardly of the cylinder block opposite said intake chamber opening, said partitions each having a varying wall thickness to provide passages of varying cross sectional area for varying the normal flow of fuel mixture flow therethrough.

17. In an engine of the sleeve valve type, a cylinder block having a cylinder formed therein provided with a plurality of circumferentially spaced intake ports, sleeve valve means for controlling said ports, an intake chamber formed in said cylinder block opening outwardly thereof, means for conducting a fuel mixture to said intake chamber opening, and means cooperating with and located substantially adjacent to said opening for dividing the fuel mixture flow into separate streams, said fuel mixture dividing means including partitions forming separate passages communicating with said cylinder intake ports, said passages having varying cross-sectional areas and conducting said fuel mixture streams inwardly of the intake chamber in a manner tending to accelerate said fuel mixture flow.

18. In an engine of the sleeve valve type, a cylinder block having a cylinder formed therein provided with a plurality of circumferentially spaced intake ports, sleeve valve means for controlling said ports, an intake chamber formed in said cylinder block opening outwardly thereof, means for conducting a fuel mixture to said intake chamber opening, said intake chamber having a plurality of partition walls terminating in spaced relation at said chamber opening for dividing the fuel mixture, said partition walls forming conduits for conducting the divisions of fuel mixture to said cylinder ports, said partitions being constructed and arranged to accelerate the fuel mixture flow through said conduits.

19. In an engine, a cylinder block structure having a cylinder, said cylinder block structure being formed with an intake chamber extending from said cylinder to an intake opening in an outer wall of the cylinder block structure, said cylinder having a plurality of intake ports opening toward said intake chamber, means for conducting an intake gas to said cylinder block intake opening, and means within said intake chamber and associated with said cylinder block intake opening for dividing the intake gas into a plurality of gas streams, said dividing means being constructed and arranged to accelerate said gas stream flow and to conduit same substantially through said intake chamber to said intake ports respectively.

20. In an engine, a cylinder block structure having a cylinder, said cylinder block structure being formed with an intake chamber extending from said cylinder to an intake opening in an outer wall of the cylinder block structure, said cylinder having a plurality of intake ports opening toward said intake chamber, means for conducting an intake gas to said cylinder block intake opening, and means within said intake chamber and associated with said cylinder block intake opening for dividing the intake gas into a plurality of gas streams, said dividing means being constructed and arranged to accelerate the flow of said gas streams and to conduct same substantially through said intake chamber to said intake ports respectively.

RALPH N. DU BOIS.